United States Patent [19]

Stevens, Jr.

[11] Patent Number: 5,287,595
[45] Date of Patent: Feb. 22, 1994

[54] FURNITURE GLIDE AND PINTLE

[75] Inventor: William H. Y. Stevens, Jr., Madison, N.J.

[73] Assignee: Robert E. Miller & Co., Inc., Newark, N.J.

[21] Appl. No.: 939,616

[22] Filed: Sep. 2, 1992

[51] Int. Cl.5 .............................................. A47B 91/06
[52] U.S. Cl. ...................................................... 16/42 T
[58] Field of Search ............ 16/18 R, 37, 42 R, 42 T; 248/188.1, 188.2, 188.4

[56] References Cited

U.S. PATENT DOCUMENTS

| 1,230,502 | 6/1917 | Millard . | |
| 1,604,293 | 10/1926 | Lehmann | 16/42 R |
| 1,783,873 | 12/1930 | Duncan, Jr. | 16/42 R |
| 1,836,246 | 12/1931 | Herold . | |
| 2,885,719 | 5/1959 | Nordmark et al. | 16/42 T |
| 3,025,557 | 3/1962 | Knowlton | 16/42 T |
| 3,989,212 | 11/1976 | Jennings | 16/42 T |
| 5,170,972 | 12/1992 | Guell | 16/42 T |

FOREIGN PATENT DOCUMENTS 485622  8/1952  Canada ................ 16/42 T

Primary Examiner—Lowell A. Larson
Assistant Examiner—Thomas C. Schoeffler
Attorney, Agent, or Firm—John W. Routh

[57] ABSTRACT

A combination glide and pintle for furniture is provided which is integrally molded in one piece from a thermoplastic.

1 Claim, 1 Drawing Sheet

FURNITURE GLIDE AND PINTLE

This invention relates to an improved glide and pintle integrally molded from plastic in one piece. More particularly this invention provides a combination glide and pintle for use on a furniture member having a cylindrical retainer opening for receiving a pintle wherein the pintle provides guide means for insertion of the pintle into the cylindrical retainer opening and engaging means for securing the glide to the furniture member.

Pintles for securing glides and casters to furniture legs and other members are old in the art. See, for example, U.S. Pat. No. 1,230,502 issued Jun. 19, 1917 to R.W. Millard. Usually the pintle is a cylindrical article, which can be attached to a glide or caster and extends upwardly therefrom, having a dome shaped end and having an annular groove or channel horizontally positioned therein to accept engaging means for securing the pintle to the cylindrical retainer opening in the furniture leg. The engaging means can be of the type disclosed in the patent or a simple O-ring, snap ring or grommet made of rubber or metal which are used commercially today.

Usually pintles are made of metal and are attached to separately made glides so that assembly of the pintle, the O-ring and the glide is required. This invention, on the other hand provides an integrally molded combination glide and pintle having self contained engaging means and guide means. If desired, casters can be attached to the underside of the glides of the combination glide and pintle of the invention.

A preferred embodiment of the combination glide and pintle of the invention is shown in the accompanying drawings wherein.

Figure 1:
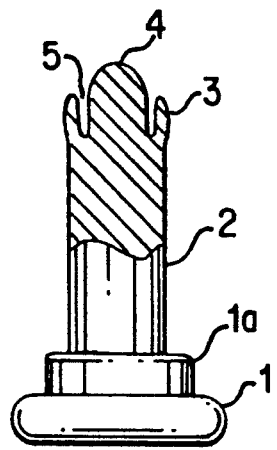
FIG. 1 is a cross-sectional view of the combination glide and pintle.

Referring now to the drawings the combination glide and pintle is shown in FIG. 1 as comprising the glide means 1 having a stepped portion 1a, the stem member 2, the sleeve 3, the guide member 4 and the annular groove 5.

Figure 2:
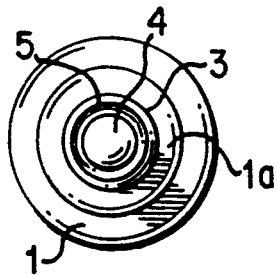
FIG. 2 is a plan view of FIG. 1 showing the circular glide, the cylindrical sleeve and the cylindrical guide.

FIG. 2 shows glide means 1, the sleeve 3, the guide member 4 and the annular groove 5 as being circumferential.

Figure 3:
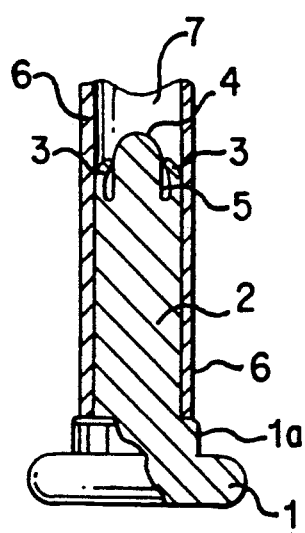
FIG. 3 is a cross-sectional view of the combination glide and pintle inserted into a metal furniture leg having a cylindrical socket retainer opening.

FIG. 3 shows the combination glide and pintle inserted into a retainer opening 7 in a furniture leg 6, the sleeve 3 being compressed into the annular groove 5 by contact with the inner wall of the retainer opening 7. The compression force of sleeve 3 against the inner wall of retainer opening 7 provides the frictional engagement to hold the combination glide and pintle in place within the retainer opening 7 of the furniture leg 6.

Figure 4:
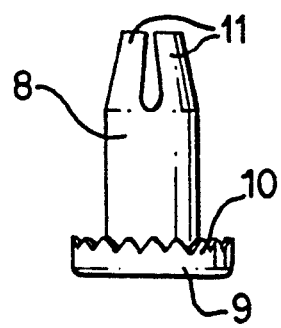
FIG. 4 is a front view of a grip-type metal socket for a wooden furniture leg.

FIG. 4 shows a conventional grip-neck type metal socket comprising a tube 8 having a base plate 9 at its lower end provided with a pronged flange 10 for driving into the under surface of a drilled leg of a piece of wooden furniture, the upper end of the tube 8 being split at diametrically opposed points and bent inwardly to form pintle retaining spring portions 11 adapted to be spread by the head of the pintle during insertion and to engage beneath the head after insertion to retain the pintle. A conventional grip-neck type metal socket is shown in FIG. 2 of U.S. Pat. No. 1,836,246.

Figure 5:
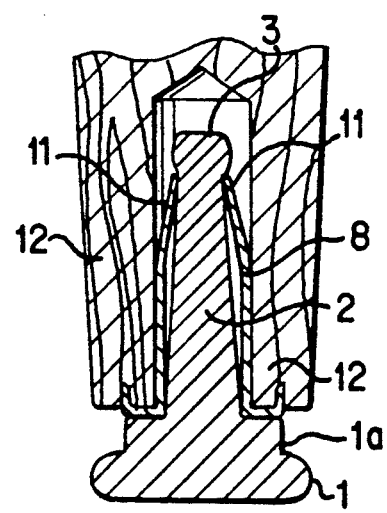
FIG. 5 is a cross-sectional view of the wooden furniture leg having a grip-type metal socket inserted therein and also having the combination glide and pintle inserted into the metal socket.

FIG. 5 shows the combination glide and pintle with the stem 2 inserted into the tube 8 in furniture leg 12 such that sleeve 3 is pushed through spring portion 11 of the grip-type metal socket. During passage through spring portion 11, the sleeve 3 is first compressed and then expands to engage the stem 2 in tube 8.

The combination glide and pintle is integrally molded in one piece from plastic having a hardness index of the order of the hardness index of Nylon 6. A suitable thermoplastic is Durethan brand of plastic marketed by Mobay Corporation, a Bayer USA Company. The thermoplastic should have good strength, rigidity and impact resistance and a hardness index on the "D" scale of about 82 to 100 or higher.

I claim:

1. A one piece molded plastic article comprising a combination glide and pintle for use on a furniture member having a (cylindrical) circular retainer opening extending into the furniture member defined by an inner cylindrical wall therein for receiving a pintle, said article (having) being a combination circular glide base and (a) pintle, said pintle comprising a cylindrical stem member having a (smaller diameter circulate stem) diameter smaller than that of the circular glide base and extending upwardly from the circular glide base.

a) the cylindrical stem member being sized smaller than the (inner cylindrical) wall of the retainer opening) circular retainer opening extending into the furniture member and defined by the inner cylindrical wall therein, b) the cylindrical stem member comprising a solid lower portion and a hollow upper portion defining a cylindrical sleeve member, the cylindrical sleeve member extending upwardly from the solid lower portion of the cylindrical stem member, and said cylindrical sleeve member having a rounded upper rim, c) the cylindrical sleeve member having an outer diameter larger than the outer diameter of the lower portion of the cylindrical stem member such that the cylindrical sleeve member defined a compressible frictional engaging means with the inner cylindrical wall of the circular retainer opening, d) a cylindrical (circular) solid guide member having a rounded top extending upwardly form the solid lower portion of the cylindrical stem member through the hollow upper portion above the solid lower portion of the cylindrical stem member within the cylindrical sleeve member and beyond the rounded upper (edge) rim o the cylindrical sleeve member (and), the cylindrical solid guide member having a diameter smaller than the inside diameter of the cylindrical sleeve member so as to define an annular channel between the cylindrical solid guide member and the cylindrical sleeve member, and e) the circular guide base and the pintle, including the cylindrical stem member, the cylindrical sleeve member and the cylindrical guide member being integrally molded.

* * * * *